(12) United States Patent
Hall

(10) Patent No.: US 7,467,492 B2
(45) Date of Patent: Dec. 23, 2008

(54) LANDSCAPE EDGING SYSTEM AND DEVICE AND METHODS OF INSTALLATION AND USE THEREOF

(76) Inventor: Richard Hall, 445 Royal St., McDonough, GA (US) 30253

( * ) Notice: Subject to any disclaimer, the term of this patent is extended or adjusted under 35 U.S.C. 154(b) by 0 days.

(21) Appl. No.: 11/725,118

(22) Filed: Mar. 16, 2007

(65) Prior Publication Data
US 2008/0223590 A1 Sep. 18, 2008

(51) Int. Cl.
*A01G 17/06* (2006.01)
*A01G 17/14* (2006.01)

(52) U.S. Cl. .......................................................... 47/33

(58) Field of Classification Search .............. 47/33, 47/56; 52/102; 404/7, 4; 405/119, 121, 405/118, 126; D25/164; 172/13, 14, 15, 172/17
See application file for complete search history.

(56) References Cited

U.S. PATENT DOCUMENTS

| | | | |
|---|---|---|---|
| 2,075,301 A | 3/1937 | Pipenhagen | |
| 2,412,705 A | 12/1946 | Jaques | |
| 2,464,695 A | 3/1949 | Landrum | |
| 2,654,180 A | 10/1953 | Redfield | |
| 2,662,342 A | 12/1953 | Peterson | |
| 3,217,480 A | 11/1965 | Orr | |
| 3,346,053 A | 10/1967 | Allegretti | |
| 3,484,989 A | 12/1969 | Lazinsky | |
| 3,545,127 A | 12/1970 | Jensen | |
| 3,627,054 A * | 12/1971 | Lay | 172/14 |
| 3,768,569 A | 10/1973 | Nunnery | |
| 3,788,001 A * | 1/1974 | Balfanz, Jr. | 47/33 |
| 4,381,622 A * | 5/1983 | Spidell | 47/33 |
| 4,663,883 A * | 5/1987 | Hilliard et al. | 47/33 |
| 4,809,459 A | 3/1989 | Brylla et al. | |
| 5,638,635 A * | 6/1997 | Palladino | 47/33 |
| 5,640,801 A * | 6/1997 | Rynberk | 47/33 |
| 5,803,662 A * | 9/1998 | Gunter | 405/119 |
| 5,810,513 A * | 9/1998 | Beamer et al. | 405/119 |
| 5,857,288 A * | 1/1999 | Wiste | 47/33 |
| 6,254,307 B1 * | 7/2001 | Ragold | 404/4 |
| 6,385,898 B1 * | 5/2002 | Noel | 47/33 |
| 6,449,897 B1 * | 9/2002 | Gaston | 47/33 |
| D472,984 S * | 4/2003 | Foster | D25/164 |
| 6,568,126 B2 * | 5/2003 | Womack | 47/33 |
| 6,625,925 B1 * | 9/2003 | Foster | 47/33 |
| 7,306,402 B2 * | 12/2007 | Graber et al. | 405/121 |

* cited by examiner

*Primary Examiner*—Árpád Fábián-Kovács
(74) *Attorney, Agent, or Firm*—Myers & Kaplan, LLC; Sandra M. Drummond

(57) ABSTRACT

A landscape edging system and device, and methods of installation and use thereof, wherein a J-shaped track system is installed in a trench along landscape edges, and wherein a pulley wheel attached to a rod is utilized to push the grass down onto a cutting edge of the track to execute the edging process, thereby simplifying the task of edging, eliminating risk of personal injury and allowing for essentially silent lawn care at any hour of the day, wherein decorative outer coverings may be incorporated along the track edging to simulate landscape features, such as rock or brick, and wherein lighted tubing may be installed within the track, thereby enhancing visual nighttime display and illuminating the landscape edge for aesthetic as well as safety reasons.

18 Claims, 3 Drawing Sheets

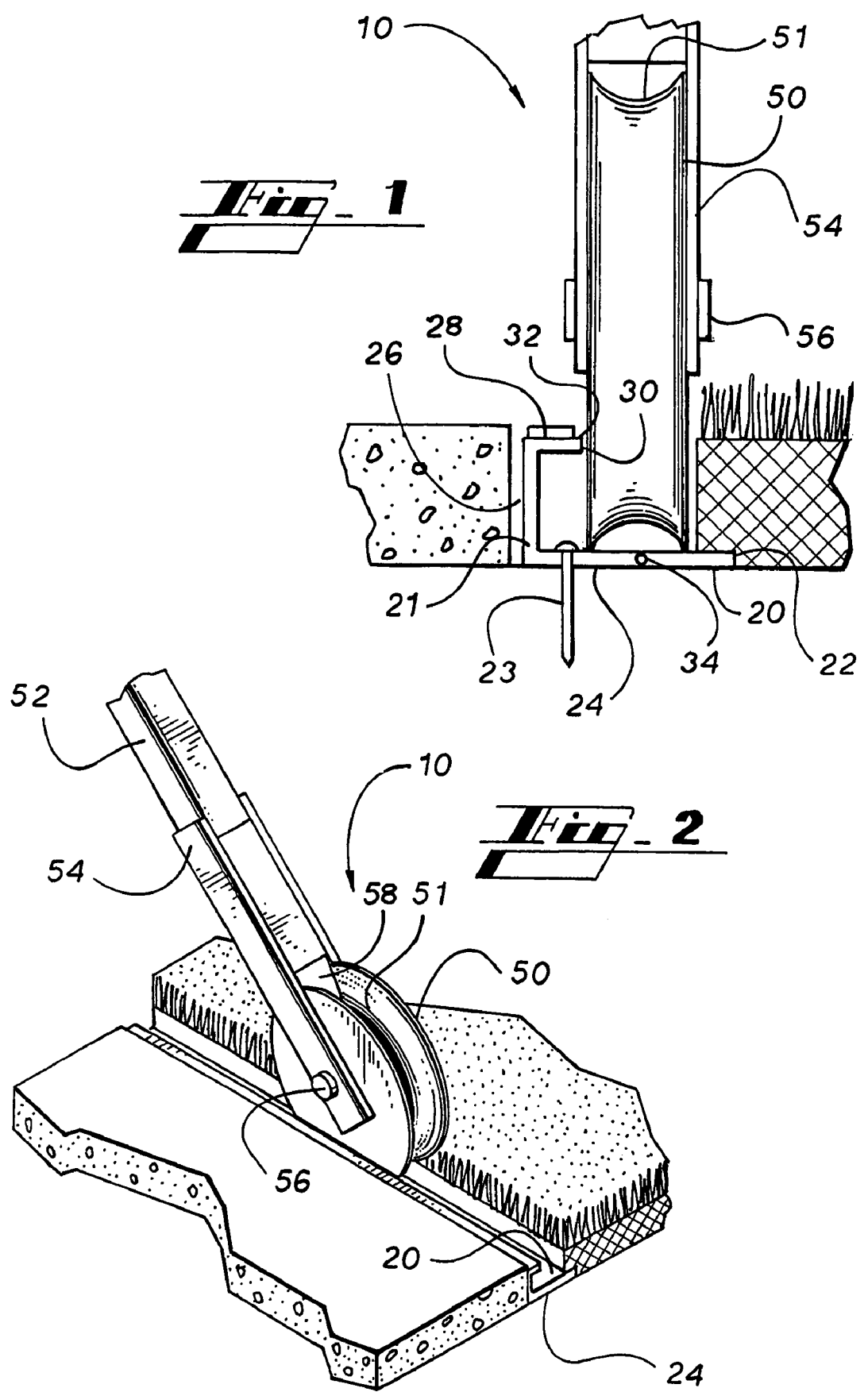

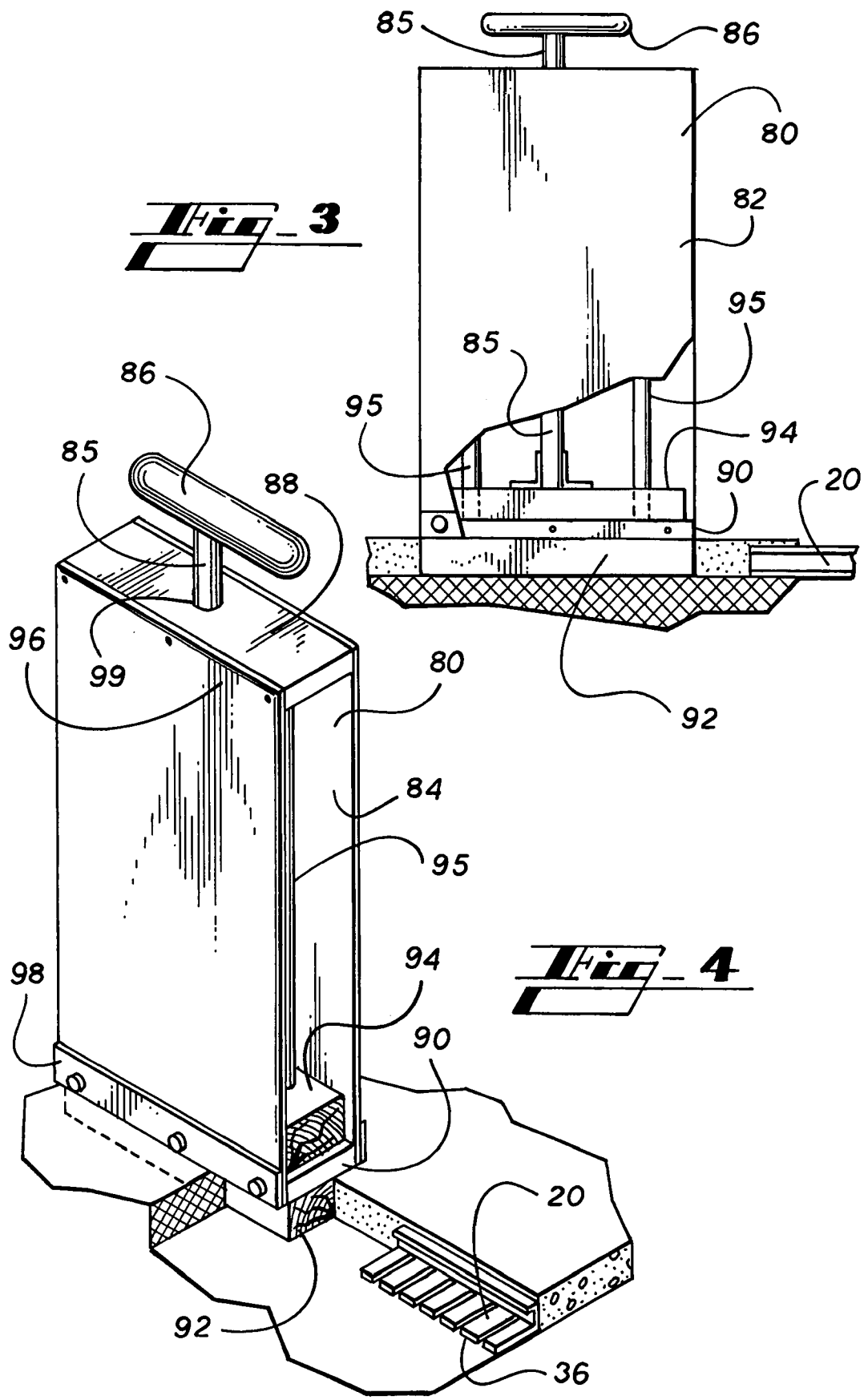

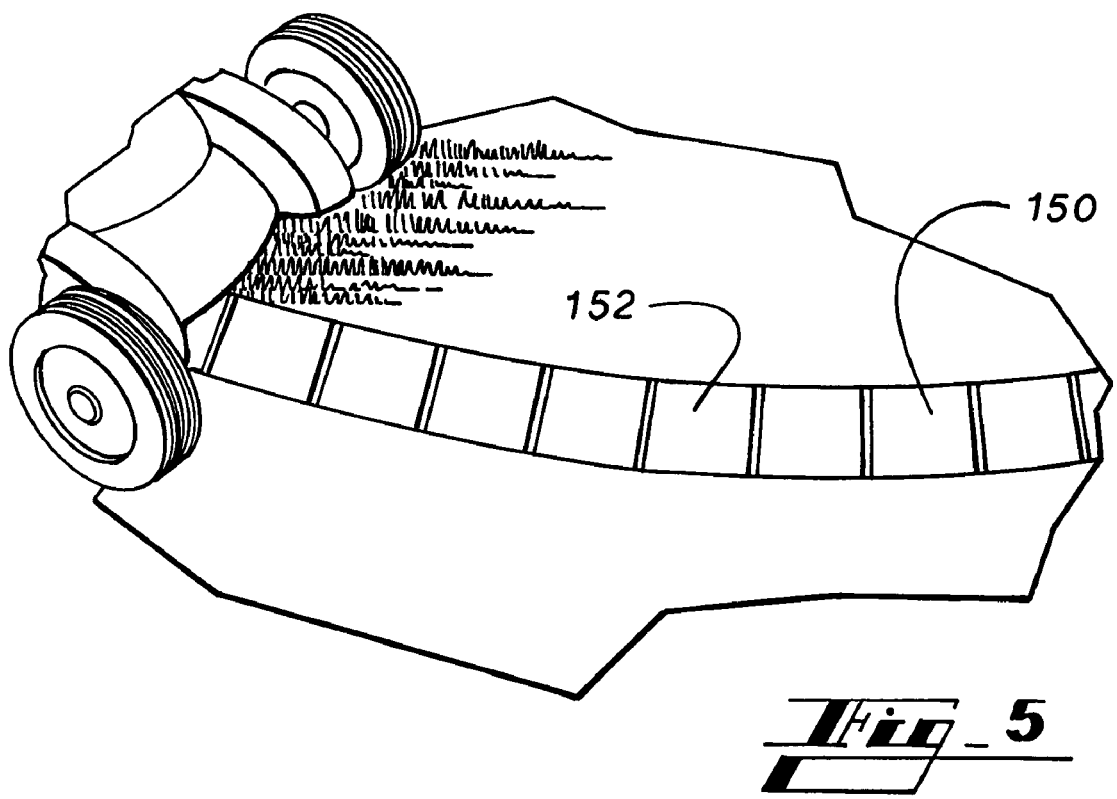
Fig_5
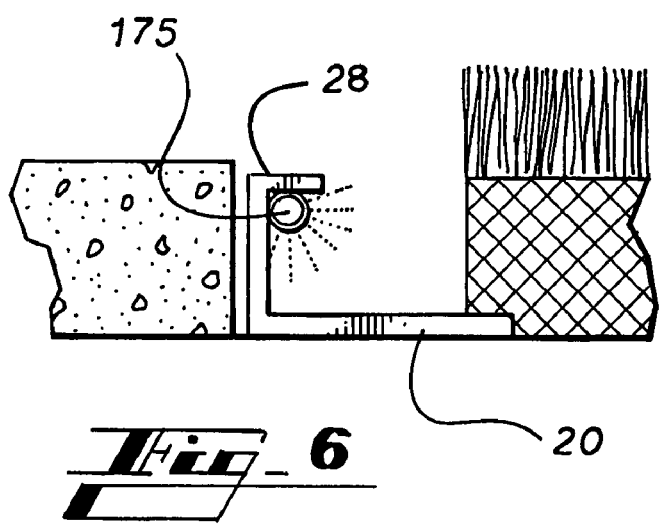
Fig_6
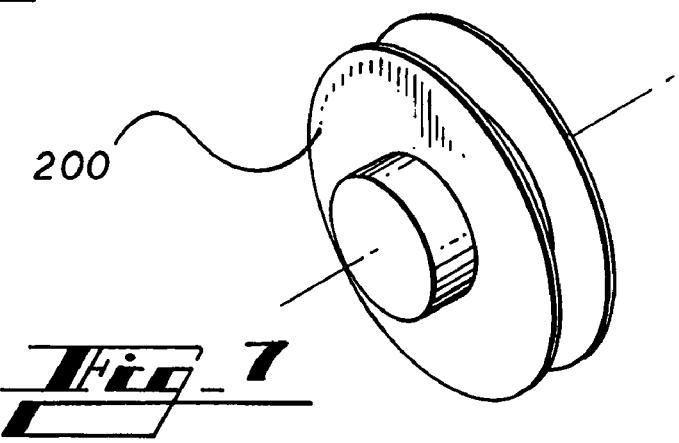
Fig_7

LANDSCAPE EDGING SYSTEM AND DEVICE AND METHODS OF INSTALLATION AND USE THEREOF

TECHNICAL FIELD

The present invention relates generally to landscaping tools and, more specifically, to a landscape edging system and device and methods of installation and use thereof, wherein a J-shaped track system is installed in a trench along landscape edges, and wherein a pulley wheel attached to a rod is utilized to push the grass down onto a cutting edge of the track to execute the edging process, thereby simplifying the task of edging and eliminating risk of personal injury, wherein decorative outer coverings may be incorporated along the track edging to simulate landscape features, such as rock or brick, and wherein lighted tubing may be installed within the track, thereby enhancing visual nighttime display and illuminating the landscape edge for aesthetic as well as safety reasons.

BACKGROUND OF THE INVENTION

Well tended landscaping increases the aesthetic appeal of all types of real estate. Both individually owned and commercial properties can realize an increase in asset value from such curb appeal. Therefore, maximizing one's real estate investment typically requires ongoing lawn maintenance and landscaping. Unfortunately, during the summer months when grass growth is rapid and/or in warm climate areas with year-round growth patterns, the repetitive mowing schedule, coupled with tedious edging, can become a lengthy, laborious, and even dangerous chore. Further, equipment purchase and maintenance can be expensive.

Unfortunately, even a freshly mowed lawn can appear unkempt if edges are not well maintained. Moreover, nicely trimmed and defined landscape edges can prolong the aesthetic appeal of a singular mowing. Traditionally, edging is accomplished with a gas or electric powered machine, wherein rotation of a sharpened blade within a defined trench zone accomplishes cutting of overgrowth. The cutting depth of the trimming edge relative to the adjacent non-grass surface, and the width of the edged zone between the edges of the grass and non-grass zones are parameters that are usually subject to user control. Unfortunately, this can disadvantageously result in crooked and otherwise unappealingly varied edge zones. Further, the noise generated by such traditional edging devices is not only unpleasant, but effectively limits an individual's ability to accomplish edging late at night or in the early morning hours, disadvantageously forcing many with long-day workweek schedules to accomplish such tasks only on the weekends.

Therefore, borne out of recognition of the appeal of defined edging, numerous devices have been provided for installation about a landscape edge. Some such devices are purely decorative and can actually serve to increase lawn maintenance difficulty, but others are designed with an edge maintenance efficiency improvement in mind.

For example, one type of edge-defining device involves the burial of an elongated barrier-type element, such as a metal strip or plastic edge. While these devices may enhance the appearance of the edged zone following installation, such devices also can increase the difficulty of the edging job. Other buried members include buried U-shaped tracks wherein grass is cut at the base of the track via a wheel with an extended rotational cutter, and buried Y-shaped tracks, wherein grass is also cut by a sharpened wheel along the side of an essentially vertically positioned track member. Although these designs enable quiet edging without the use of electric or gas powered tools, each necessitates use of a sharpened wheel, disadvantageously risking injury from accidental contact with the sharpened wheel and limiting use thereof by some individuals.

Therefore, it is readily apparent that there is a need for an edging system and device, wherein edging efficiency is increased through burial of a J-shaped track, wherein the track not only assists in the definition of the landscape edge, but also enhances safety by enabling quiet grass cutting via rotation of a wheel proximate an underground cutting edge defined along the track J-shape, and wherein the J-shape track also enables installation of one or more design components, including underground edge effects, thus providing aesthetic as well as economic, operational, and safety benefits and avoiding the above-discussed disadvantages.

BRIEF SUMMARY OF THE INVENTION

Briefly described, in a preferred embodiment, the present invention overcomes the above-mentioned disadvantages and meets the recognized need for such a device by providing a landscape edging system and device, and methods of installation and use thereof, wherein a J-shaped track system is installed in a trench along landscape edges, and wherein a pulley wheel attached to a rod is utilized to push the grass down onto a cutting edge of the track to execute the edging process, thereby simplifying the task of edging, eliminating risk of personal injury and allowing for essentially silent lawn care at any hour of the day, wherein decorative outer coverings may be incorporated along the track edging to simulate landscape features, such as rock or brick, and wherein lighted tubing may be installed within the track, thereby enhancing visual nighttime display and illuminating the landscape edge for aesthetic as well as safety reasons.

According to its major aspects and broadly stated, the present invention is an edging system and device, wherein edging technique efficiency is increased through burial of a J-shaped track, wherein the track not only assists in the definition of the landscape edge, the track enhances safety by enabling grass cutting via rotation of a wheel proximate a cutting edge defined along the track J-shape, and wherein J-shape track also enables installation of one or more design components, including underground edge effects.

More specifically, the device of the present invention in its preferred form is a yard edging system having elongate track members with a generally J-shaped cross-section, wherein the track system is designed to be placed in a trench and installed around the sides of driveways, sidewalks, curbs, and the like, for receiving an edging tool. Installation is preferably accomplished via the use of a box-style packing tool, wherein a trench is dug and then packed with the box-style tool to compact and ready the trench interior to receive the track therein.

The J-shaped track is preferably positioned within the trench such that the distal end, or top of the "J" extends toward the landscape and the essentially flat bottom of the "J" abuts the concrete or other surface proximate the landscape, wherein the "J" is essentially defined as if lying on its back in the trench. The track members preferably include installation apertures, wherein adhesive is preferably applied thereto and permitted to exude therethrough in order to form a "securing button" following drying. Additionally, landscape foundational elements, such as soil, are preferably back filled to bury some portion of the distal end of the "J".

Track pieces may include incisions in order to facilitate arcuate placement around landscape features. Additionally, decorative outer covering may be installed, simulating a rock or brick edge, for example. Further, the track shape enables optional installation of illuminated roping within the base of the "J", proximate the trimming edge, whereby resulting nighttime accentuation of the landscape edge offers safety as well as aesthetic benefits, and enables night trimming.

A simple, rotationally mounted pulley-wheel is utilized following track installation, wherein insertion of the pulley-wheel into the track, with rotational movement therealong, with the pulley-wheel positioned proximate the distal, upturned edge of the "J", essentially snaps off stray blades of grass. Thus, the uniquely shaped track enables edging without the use of a sharpened wheel. Additionally, utilization of the preferred grooved pulley-wheel design enables prevention of time consuming clogging via incorporation of an on-board cleaning member to strip dirt and debris from the wheel groove automatically during rotation.

Although the system is preferably installed and utilized according to the non-mechanized embodiment described hereinabove in order to minimize sound effects during use, a powered version is envisioned as an alternative, wherein a re-charger system, or other suitable source could be employed to power rotation of the wheeled tool. Further, the installation of such an embodiment could be modified to allow for automated and/or semi-automated edging.

A feature and advantage of the present invention is the ability of such a system, device and method to provide a below-ground cutting surface, thereby enhancing safety of the edging process.

Another feature and advantage of the present invention is the ability of such a system, device and method to provide a permanent installed track system to facilitate efficiency of the edging process and to refine the defined landscape edge.

Another feature and advantage of the present invention is the ability of such a system, device and method to operate in a self-cleaning fashion, thereby enabling more effective time investment via reduced clog frequency.

Still another feature and advantage of the present invention is the ability of such a system, device and method to resist impedance caused by foreign objects within the track, wherein the interaction of the shapes of the wheel and the track serve to displace same.

Yet another feature and advantage of the present invention is the ability of such a system, device and method to virtually eliminate risk of cutting-type injury to the user, thereby permitting essentially anyone to perform a previously specifically limited task.

Another feature and advantage of the present invention is the ability of such a system, device and method to enable a user to efficiently perform lawn maintenance chores.

Yet another feature and advantage of the present invention is the ability of such a system, device and method to provide a compact edging tool to enable storage within limited space.

Still another feature and advantage of the present invention is the ability of such a system, device and method to minimize the incidence of breakage of and/or damage to components from stones, sticks or other lawn debris.

Still yet another feature and advantage of the present invention is the ability of such a system, device and method to increase the universality of adaptation to any type of landscape by accommodating curves and offering a variety of aesthetic finishing options.

Still yet another feature and advantage of the present invention is the ability of such a system, device and method to be easily installed via a specialized trench preparation packing tool.

Yet still another feature and advantage of the present invention is the ability of such a system, device and method to provide decorative, simulated landscape features, such as rock or brick edging.

Still another feature and advantage of the present invention is the ability of such a system, device and method to enhance visual nighttime display, illuminating the landscape edge via installed lighted tubing, providing aesthetic as well as safety benefits.

Still yet another feature and advantage of the present invention is the ability of such a system, device and method to maintain a defined landscape edge without requiring use of sharpened blade or wheel.

Still another feature and advantage of the present invention is the ability of such a system, device and method to easily maintain a uniform cutting depth of the trimming edge relative to the adjacent non-grass surface, and uniform width of the edged zone between the edges of the grass and non-grass zones.

Yet another feature and advantage of the present invention is the ability of such a system, device and method to avoid unpleasant noise generation, thereby enabling edging to be accomplished at any time of day.

Still another feature and advantage of the present invention is the ability of such a system, device and method to provide for on-board cleaning of dirt from the rotational edging tool, essentially eliminating time consuming clogs.

Another feature and advantage of the present invention is the ability of such a system, device and method to be adapted for powered use and/or automated or semi-automated operation and edging.

These and other features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which:

FIG. 1 is a cross-sectional end view of a landscape edging system and device according to a preferred embodiment of the present invention, showing a track installed within a trench between concrete and a landscape, with a pulley wheel positioned therein;

FIG. 2 is an overhead view of the landscape edging system and device of FIG. 1;

FIG. 3 is an overhead perspective view of the landscape edging system and device of the present invention, showing a portion of partially installed track, a portion partially prepared trench, and a trench packing tool, according to a preferred embodiment;

FIG. 4 is a perspective view of the landscape edging system and device of FIG. 3;

FIG. 5 is an overhead view of the landscape edging system and device of the present invention, according to an alternate embodiment, showing a decorative cover installed thereon;

FIG. 6 is a cross-sectional end view of the landscape edging system and device of the present invention, according to an alternate embodiment, showing a lighted feature installed therewith; and FIG. 7 is a perspective side view of a powered pulley wheel according to an alternate embodiment of the landscape edging system and device of the present invention.

DETAILED DESCRIPTION OF THE PREFERRED AND ALTERNATE EMBODIMENTS

In describing the preferred and alternate embodiments of the present invention, as illustrated in the figures and/or described herein, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-2, landscape edging system and device 10 preferably comprises J-shaped track 20 and wheel 50. Preferably, the J-shape cross-section of J-shaped track 20 is structurally defined, wherein distal end 22 defines the top of the letter "J" and base 24 extends from distal end 22 to define the long, straight arm of the letter "J". Sidewall 26 preferably extends from distal end 22 and defines the bottom of the letter "J". And finally, upper edge 28 preferably extends from sidewall 26, defining the short, upturned leading arm of the letter "J", wherein edge 30 is defined at proximate end 32 of J-shaped track 20.

Preferably, J-shaped track 20 is elongated, wherein multiple pieces 21 of J-shaped track 20 are preferably placed end-to-end in order to define a length-extended landscape edge. It should be recognized by one skilled in the art that pieces 21 of J-shaped track 20 could also overlap one another, or J-shaped track 20 could be defined by one appropriately configured and elongated track member and/or with custom length for a selected landscape. J-shaped track 20 preferably further comprises installation apertures 34, whereby adhesive preferably passes through rear wall 24 and functionally secures J-shaped track 20 after installation.

Pieces 21 of J-shaped track 20 may include plurality of incisions 36 in order to facilitate arcuate placement around landscape features, whether in a concave or convex configuration, such as around the sides of driveways, sidewalks, curbs, and the like, and pieces 21 of J-shaped track 20 may also be imparted with selected coloration, in order to blend in, or be relatively camouflaged with the surrounding landscape elements.

Preferably, wheel 50 is attached to rod 52 via bracket 54, wherein bracket 54 permits rotational movement of wheel 50 about axis 56, and wherein axis 56 is transversely defined relative to rod 52, such that rod 52 may preferably be effective at transferring downward forces from the user to wheel 50 during use. Preferably, wheel 50 is a pulley-style wheel, as depicted in the figures, wherein benefits from such a configuration include a preferred self-cleaning adaptation. That is, preferably, wheel 50 includes circumferential groove 51, and rod 52 supports on-board cleaning member 58, preferably on both sides of wheel 50, wherein on-board cleaning member 58 extends at least partially into circumferential groove 51. The preferred dual-directional extension of on-board cleaning member 58 into circumferential groove 51 enables effective self-cleaning via removal of soil/dirt and debris irrespective of the direction of rotation of wheel 50.

Of course, it is possible that on-board cleaning member 58 could be limited to one installation, wherein self-cleaning would be limited to one direction of rotation. And further, it is also possible that wheel 50 could be alternately configured, such as, without circumferential groove 51, wherein no self-cleaning feature would be provided, but essential functionality of lawn edging system and device 10 would remain.

As discussed hereinbelow, the unique J-shaped track 20 of the present lawn edging system, device and method 10 enables edging without the use of a sharpened wheel; it is thus preferred that wheel 50 be comprised of non-sharp rotational edges. However, although such a non-sharp configuration is preferred, one skilled in the art should readily recognize that a sharp-edged pulley wheel could alternately be utilized, mindful, of course, of increased risk to safety.

Preferably, lawn edging system, device and method 10 also comprises trench packing tool 80, depicted in FIGS. 3-4. Trench packing tool 80 preferably comprises opposing, essentially planar, rectangular-shaped outer walls 82, 84, down rod 85, handle 86, upper block 88, base block 90, trench definer block 92, inner hammer block 94, and plurality of vertical directional guides 95. Preferably, upper block 88 and base block 90 are securely fastened between outer walls 82 and 84, proximate first end 96 and second end 98, respectively, of outer walls 82, 84, thereby defining the upper and lower most boundaries of trench packing tool 80.

Preferably, handle 86 is provided on down rod 85, wherein down rod 85 preferably extends through upper block 88 and is secured to inner hammer block 94. Aperture 99 in upper block 88 is preferably dimensioned to facilitate vertical movement of down rod 85 therethrough, thus enabling vertical movement of inner hammer block 94 to be directed via handle 86 of down rod 85. Preferably, plurality of directional guides 95 are also provided, preferably at least one on either side of down rod 85, wherein plurality of directional guides 95 are securely fastened, extending between upper block 88 and base block 90, and extending through inner hammer block 94. This preferred configuration assists with continued alignment of inner hammer block 94 during use. Trench definer block 92 is preferably secured to base block 90, wherein trench definer block 92 is preferably dimensioned to pack or otherwise define an appropriate trench conformation for subsequent receipt of J-shaped track 20.

In an alternate embodiment, one example of which is depicted in FIG. 5, decorative outer covering 150 may be installed, such as, for exemplary purposes, simulating a rock or brick edge. Decorative outer covering 150 preferably extends downwardly into the trench, proximate J-shaped track 20, with upper decorative surface 152 cross-positioned relative thereto. While upper decorative surface 152 may be three-dimensional, such as to create an illusion of a brick, it may also be flat, such that a mower could be driver thereover without disturbance, as is depicted. Decorative outer covering 150 may be defined as a plurality of interlocking, overlapping, or abutting members, or may be one integrally formed member, wherein essentially any relative arrangement may be utilized in order that a selected landscape edge is suitably decorated according to the user's desire.

Further, the preferred shape of J-shaped track 20 enables optional installation of illuminated roping 175 proximate base 26 and upper edge 28 of the "J"-shape, proximate trimming edge 30, whereby resulting nighttime accentuation of the landscape edge offers safety as well as aesthetic benefits, and enables night trimming. It should be understood that such lighting effects could include other lightable members, including solar or any other type of power, and in other configurations aside from rope-style, without departing from the intended scope of the present invention.

Referring now to FIG. 7, in an alternate embodiment, powered wheel 200 could be utilized, wherein any suitable power source, whether disposable, rechargeable, or a combination thereof, could be employed to power rotation of powered wheel 200 via known powered rotational mechanisms. Further, powered wheel 200 could be installed within or proximate to J-shaped track 20, wherein remote or periodically programmed automatic operation could be facilitated without requiring insertion of powered wheel 200 into J-shaped track 20 at the time of the task.

In another alternate embodiment, wheel 50 could be adapted for installation proximate a mower, wherein edging could be effected coincident with mowing, upon lowering of wheel 50 into the landscape edge trench.

According the preferred use of the present invention, installation of J-shaped track 20 is preferably accomplished via the use of trench packing tool 80, wherein a trench is dug and then trench packing tool 80 is placed therein. Inner hammer block 94 is raised and lowered via down rod 85, wherein downward force delivered thereby to base block 90 is transferred to trench definer block 92 and the trench is quickly and easily packed into the appropriate and preferred confirmation.

Following trench preparation, J-shaped track 20 is preferably positioned within the trench such that distal end 22, or top of the "J" extends toward the landscape and essentially flat bottom 26 of the "J" abuts the concrete or other surface proximate the landscape, wherein the "J" is essentially defined as if lying on its back 24 in the trench. Adhesive is preferably applied via apertures 34 and is preferably permitted to exude therethrough in order to form a "securing button" following drying. Alternately, or in addition, nails 23 or the like could be installed as a means for securing J-shaped track 20 into the landscape edge trench. Additionally, landscape foundational elements, such as soil, are preferably back filled to bury some portion of distal end 22 of J-shaped track member 20.

As an installation option, concrete and crack sealant can be installed on upper edge 28 of J-shaped track 20, wherein coloration can be utilized to further blend system and device 10 with the surrounding landscape.

Following installation, simple, rotational movement of wheel 50 is utilized to accomplish the edging process, wherein insertion of wheel 50 into J-shaped track 20, as is depicted in FIGS. 1-2, with rotational movement there along, with wheel 50 positioned proximate upturned edge 30 of the "J", essentially snaps off stray blades of grass or other stray vegetation.

According to the preferred installation and use, if a foreign object is encountered within J-shaped track 20, if the object is far enough out into J-shaped track 20, away from base 26 thereof, the side of wheel 50 will displace the object out of J-shaped track 20. If the object is suitably sized and relatively centrally positioned within the track, wheel 50 will pass thereover. And, lastly, if the object is large enough, circumferential recess 51 of wheel 50 will function to grab and retain the object for subsequent dislodging via on-board cleaning member 58.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A landscape edging system and device, comprising:
   a generally J-shaped track member for installation below the surface of the ground;
   a wheel, said wheel adapted for rotational movement within said track member; and
   a trench packing tool, said trench packing tool further comprising a handle, down-rod, hammer block member, and trench defining block, wherein said handle is carried by said down rod, said down rod is secured to said hammer block member, and said trench defining block is positioned to receive a force from said hammer block member.

2. The landscape edging system and device of claim 1, further comprising a decorative outer covering for installation proximate said generally J-shaped track member and extending at least partially above the surface of the ground.

3. The landscape edging system and device of claim 2, wherein said decorative outer covering simulates a landscape feature selected from the group of: rock or brick.

4. The landscape edging system and device of claim 1, further comprising at least one lighted member installed proximate said J-shaped track member.

5. The landscape edging system and device of claim 1, wherein said J-shaped track member is a plurality of J-shaped track members installed proximate one another.

6. The landscape edging system and device of claim 5, wherein at least one said J-shaped track member of said plurality of J-shaped track members comprises flexibility-imparting incisions.

7. The landscape edging system and device of claim 1, wherein said trench packing tool further comprises a first and second peripheral wall, and an upper and a lower block member affixed to and between said first and second peripheral walls, wherein said down rod extends through said upper block member, wherein said down rod can move relative to said upper block member, wherein said trench defining block is carried proximate said lower block member, external to said first and second peripheral walls, and wherein said lower block member receives the force of said hammer block member and transfers the force to said trench defining block.

8. The landscape edging system and device of claim 7, wherein said trench packing tool further comprises at least one alignment rod extending between and secured to said upper and lower block members, and extending through said hammer block member.

9. The landscape edging system and device of claim 1, wherein said J-shaped track further comprises at least one installation aperture defined therethrough.

10. The landscape edging system and device of claim 1, wherein said wheel is a pulley wheel.

11. The landscape edging system and device of claim 1, wherein said wheel is a powered for rotational movement thereof.

12. The landscape edging system and device of claim 1, wherein said wheel is attached to a rod via a bracket that permits rotational movement of said wheel about an axis transversely defined relative to said rod.

13. The landscape edging system and device of claim 12, wherein said wheel is a pulley-style wheel comprising a circumferential groove, and wherein said rod supports at least one cleaning member extending at least partially into said circumferential groove.

14. The landscape edging system and device of claim 1, wherein said wheel is mounted to a mower.

15. A method of installation and use of a landscape edging system and device, comprising the steps of:
   obtaining at least one J-shaped track member with at least one aperture defined through a back thereof;
   digging a trench;
   obtaining a trench packing member, said trench packing member further comprising a handle, down-rod, hammer block member, and trench defining block, wherein said handle is carried by said down rod, said down rod is secured to said hammer block member, and said trench defining block is positioned to receive a force from said hammer block member;

packing the trench with said trench packing member;

positioning said at least one J-shaped track member within the trench such that a distal end of said at least one J-shaped track member extends toward the landscape and a bottom of said at least one J-shaped track member abuts the surface opposing the landscape, wherein said at least one J-shaped track member is essentially defined as if lying on its back in the trench;

backfilling landscape foundational elements onto at least some portion of said distal end of said at least one J-shaped track member, if desired;

placing a wheel into said at least one J-shaped track member; and rotationally moving said wheel along said at least one J-shaped track member.

16. The method of claim 15, further comprising the step of: applying sealant to said at least one J-shaped track member.

17. The method of claim 15, further comprising the step of: installing at least one lighted feature within said at least one shaped track member.

18. The method of claim 15, further comprising the step of: applying adhesive via said at least one aperture of said at least one J-shaped track member.

* * * * *